US011580861B2

(12) United States Patent
Bang et al.

(10) Patent No.: US 11,580,861 B2
(45) Date of Patent: Feb. 14, 2023

(54) PLATOONING CONTROLLER, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Kyung Joo Bang, Seoul (KR); Hong Gi Park, Seoul (KR); Sang Yeob Lee, Seongnam-si (KR); Il Hwan Kim, Hwaseong-si (KR); Seung Hyun Kim, Seoul (KR); Dong Hyuk Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 389 days.

(21) Appl. No.: 16/743,910

(22) Filed: Jan. 15, 2020

(65) Prior Publication Data
US 2021/0035451 A1 Feb. 4, 2021

(30) Foreign Application Priority Data
Jul. 29, 2019 (KR) .................. 10-2019-0091754

(51) Int. Cl.
*G08G 1/00* (2006.01)
*G08G 1/16* (2006.01)
(Continued)

(52) U.S. Cl.
CPC .............. *G08G 1/22* (2013.01); *B60Q 9/008* (2013.01); *G08G 1/161* (2013.01); *G08G 1/166* (2013.01);
(Continued)

(58) Field of Classification Search
CPC .......... G08G 1/22; G08G 1/161; G08G 1/166; B60Q 9/008; B60Q 1/34; B60Q 1/525; B62D 1/00
See application file for complete search history.

(56) References Cited

U.S. PATENT DOCUMENTS

| 2010/0256852 | A1* | 10/2010 | Mudalige ............... G08G 1/164 |
| | | | 701/24 |
| 2015/0197248 | A1* | 7/2015 | Breed ................. G08G 1/09626 |
| | | | 340/905 |

(Continued)

FOREIGN PATENT DOCUMENTS

JP  2002-266672 A  9/2002

*Primary Examiner* — Anne Marie Antonucci
*Assistant Examiner* — Patrick M Brady
(74) *Attorney, Agent, or Firm* — Morgan, Lewis & Bockius LLP

(57) ABSTRACT

A platooning controller, a vehicle system including the same, and a method thereof are provided. The platooning controller includes a processor that identifies information about outside vehicles around a platooning line based on sensing information of platooning vehicles, determines whether views of the outside vehicles are obstructed by the platooning line based on the information about the outside vehicles, controls the platooning vehicles such that the views of the outside vehicles are obtained, and performs collision avoidance control and a storage storing the sensing information or a result of determination of whether a view is obstructed.

18 Claims, 7 Drawing Sheets

(51) Int. Cl.
*B60Q 9/00* (2006.01)
*B60Q 5/00* (2006.01)
*B60Q 1/34* (2006.01)
*B60Q 1/50* (2006.01)

(52) U.S. Cl.
CPC ............... *B60Q 1/34* (2013.01); *B60Q 1/525* (2013.01); *B60Q 5/00* (2013.01)

(56) References Cited

U.S. PATENT DOCUMENTS

| | | | | |
|---|---|---|---|---|
| 2016/0379411 | A1* | 12/2016 | Harbach | G06F 3/1423 345/633 |
| 2020/0241563 | A1* | 7/2020 | Van Der Knaap | B60W 30/12 |
| 2021/0304618 | A1* | 9/2021 | Okuyama | G08G 1/09 |

* cited by examiner

PLATOONING CONTROLLER, SYSTEM INCLUDING THE SAME, AND METHOD THEREOF

CROSS-REFERENCE TO RELATED APPLICATION

The present application claims priority to and the benefit of Korean Patent Application No. 10-2019-0091754, filed on Jul. 29, 2019, which is incorporated herein by reference in its entirety.

TECHNICAL FIELD

The present disclosure relates to a platooning controller, a system including the same, and a method thereof, and more particularly, relates to predicting an accident of collision between outside vehicles during platooning.

BACKGROUND

The statements in this section merely provide background information related to the present disclosure and may not constitute prior art.

Platooning is a manner which exchanges motion and context information of a leading vehicle through real-time communication between vehicles, maintains a certain interval from the leading vehicle, and drives several vehicles together. Because such platooning maintains the certain interval from the leading vehicle to drive the several vehicles together, it reduces air resistance of following vehicles to save fuel efficiency and reduces the risk of accident.

Such platooning vehicles integrate information about obstacles around a platooning line, detected by each of the platooning vehicles, to evaluate the risk of collision with a forward vehicle and control braking or steering to avoid the collision. Because of considering only the risk of collision between a platooning line and the forward vehicle, it is unable to avoid the risk of collision between outside vehicles around the platooning line because views of users of the outside vehicles are obstructed by the platooning line or because sensor sensing areas of the outside vehicles are limited by the platooning line.

In other words, as shown in FIG. 1, outside vehicles OV1 and OV2 which are traveling around a platooning line during platooning are hidden due to platooning vehicles and do not recognize each other. When the outside vehicle OV1 changes its lane, collision may occur.

As views of users of outside vehicles which are traveling around a platooning line within a short range from the platooning line are limited by the long platooning line, when there occurs an accident of collision between the outside vehicles, platooning vehicles are affected by the accident and are involved in a secondary accident.

SUMMARY

An aspect of the present disclosure provides a platooning controller for preventing an accident between outside vehicles, capable of occurring due to view obstruction by a platooning line during platooning, and preventing secondary damage of platooning vehicles by the accident between the outside vehicles, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

In one aspect of the present disclosure, a platooning controller may include: a processor that identifies information about outside vehicles around a platooning line based on sensing information of platooning vehicles, determines whether views of the outside vehicles are obstructed by the platooning line based on the information about the outside vehicles, controls the platooning vehicles such that the views of the outside vehicles are obtained, and performs collision avoidance control and a storage storing the sensing information received from the platooning vehicles or the result of determining whether a view is obstructed, the result being obtained by the processor.

In some forms of the present disclosure, the information about the outside vehicles may include at least one or more of locations, movement directions, and/or speeds of the outside vehicles.

In some forms of the present disclosure, the processor may determine whether there is a risk of collision between the outside vehicles, when it is determined that the views of the outside vehicles are obstructed.

In some forms of the present disclosure, the processor may warn the platooning vehicles and the outside vehicles about the risk of collision, when there is the risk of collision.

In some forms of the present disclosure, the processor may determine whether it is able to control to obtain the views of the outside vehicles, when there is the risk of collision.

In some forms of the present disclosure, the processor may determine whether it is able to decelerate the platooning vehicles or change a lane of the platooning vehicles and may determine whether it is able to control to obtain the views of the outside vehicles.

In some forms of the present disclosure, the processor may control to obtain the views of the platooning vehicles and may determine whether it is able for the platooning vehicles to avoid a collision prediction point of the outside vehicles to travel.

In some forms of the present disclosure, the processor may determine whether it is able to decelerate the platooning vehicles or change a lane of the platooning vehicles and may determine whether it is able for the platooning vehicles to avoid the collision prediction point of the outside vehicles to travel.

In some forms of the present disclosure, the processor may complete the control to obtain the views and may perform deceleration or lane change control such that the platooning vehicles avoid a collision prediction point of the outside vehicles to travel.

In another aspect of the present disclosure, a vehicle system may include: a communication device that performs communication between platooning vehicles and a platooning controller that identifies information about outside vehicles around a platooning line based on sensing information of the platooning vehicles, determines whether views of the outside vehicles are obstructed by the platooning line based on the information about the outside vehicles, controls the platooning vehicles such that the views of the outside vehicles are obtained, and performs collision avoidance control.

In some forms of the present disclosure, the vehicle system may further include a warning device that is controlled by the platooning controller to warn the outside vehicles about a risk when the risk of collision between the outside vehicles is predicted.

In some forms of the present disclosure, the warning device may include at least one or more of turn signals, emergency lights, a horn, an external light device, and/or a vehicle-to-vehicle (V2V) communication device.

In some forms of the present disclosure, the platooning controller may determine whether there is a risk of collision between the outside vehicles, when it is determined that the views of the outside vehicles are obstructed, may warn the platooning vehicles and the outside vehicles about the risk of collision using the warning device, when there is the risk of collision, and may control to obtain the views of the outside vehicles.

In some forms of the present disclosure, the platooning controller may determine whether it is able to decelerate the platooning vehicles or change a lane of the platooning vehicles and may determine whether it is able for the platooning vehicles to avoid a collision prediction point of the outside vehicles to travel.

In some forms of the present disclosure, the vehicle system may further include a display that displays at least one or more of information for platooning, information about the outside vehicles, and/or a screen for warning of a risk of collision.

In another aspect of the present disclosure, a platooning control method may include: identifying information about outside vehicles around a platooning line based on sensing information of platooning vehicles, determining whether views of the outside vehicles are obstructed by the platooning line based on the information about the outside vehicles, controlling the platooning vehicles, such that the views of the outside vehicles are obtained when the views are obstructed, and controlling the platooning vehicles to avoid collision, when the collision between the outside vehicles is predicted.

In some forms of the present disclosure, the determining whether the views of the outside vehicles are obstructed may include calculating viewing angles of users of the outside vehicles using locations, movement directions, and speeds of the outside vehicles and determining that the views are obstructed when another outside vehicle is not included within the viewing angles of the users of the outside vehicles by the platooning line.

In some forms of the present disclosure, the controlling of the platooning vehicles may include decelerating the platooning vehicles or changing a lane of the platooning vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
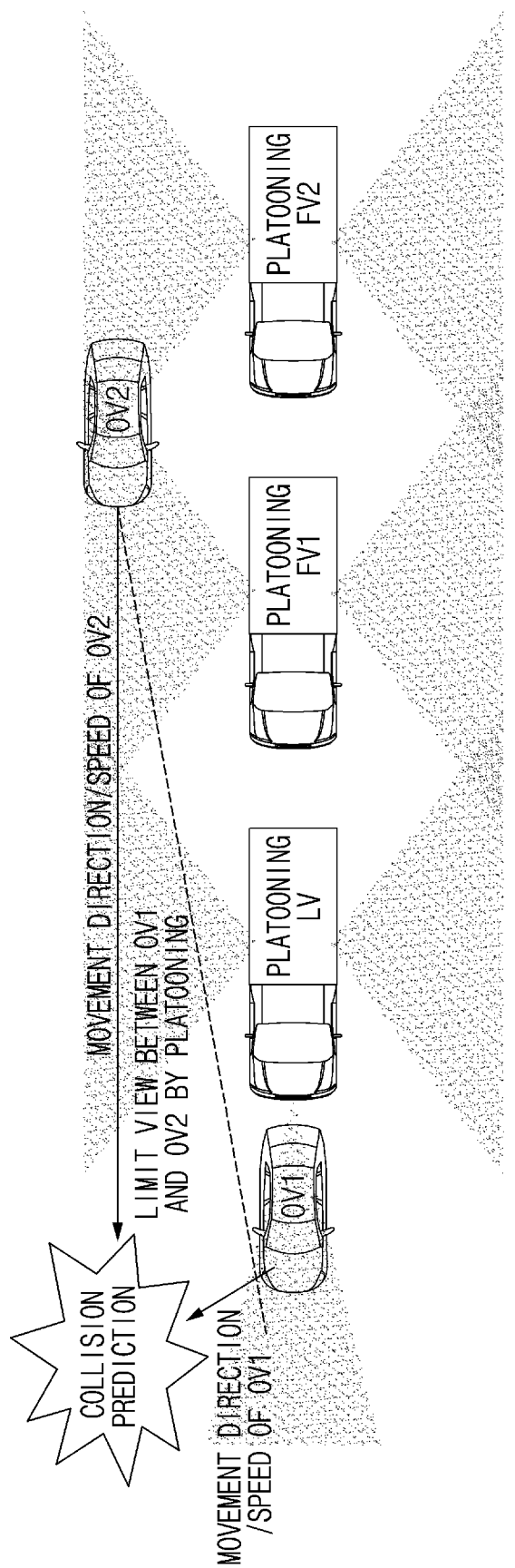
FIG. 1 is a drawing illustrating an example in which views of outside vehicles are limited by a platooning line during platooning in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Some forms of the present disclosure may discloses predicting the risk that an accident will occur with regard to motion of an outside vehicle, a limit on a view of a user by a platooning line, and a limit on a sensing area of a sensor during platooning and avoiding the predicted risk.

Hereinafter, a description will be given with reference to FIGS. 2 and 7.

Figure 2:
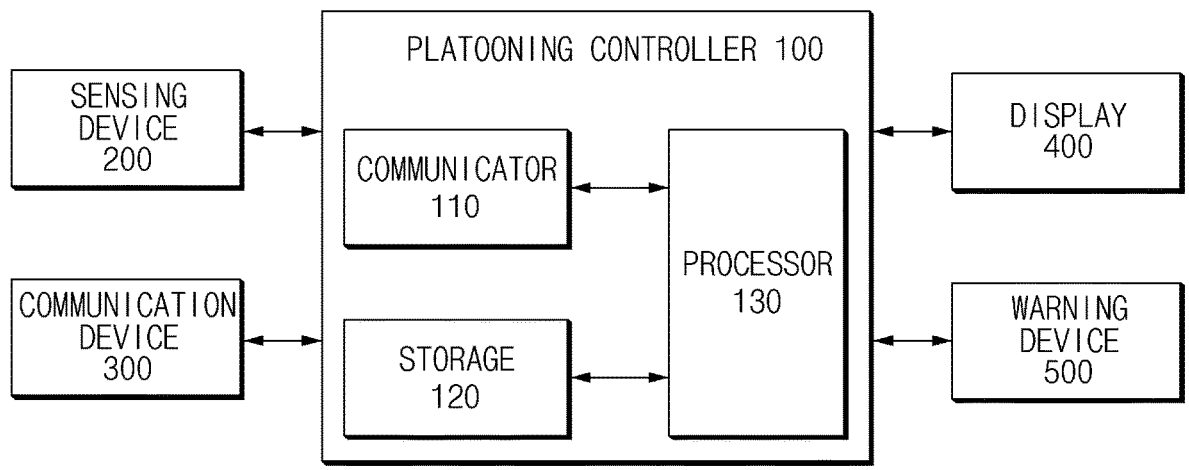
FIG. 2 is a block diagram illustrating a configuration of a vehicle system including a platooning controller in one form of the present disclosure.

FIG. 2 is a block diagram illustrating a configuration of a vehicle system including a platooning controller in some forms of the present disclosure.

Referring to FIG. 2, the vehicle system in some forms of the present disclosure may include a platooning controller 100, a sensing device 200, a communication device 300, a display 400, and a warning device 500.

The platooning controller 100 may calculate driving costs of respective vehicles in a platooning line and may compare the driving costs of the respective vehicles to determine whether it is necessary to change a location of a leading vehicle in the platooning line. When it is necessary to change the location of the leading vehicle, the platooning controller 100 may control to change the location of the leading vehicle. In this case, information about outside vehicles may include at least one or more of locations, movement directions, and/or speeds of the outside vehicles. Furthermore, the platooning controller 100 is loaded into the leading vehicle. However, forms of the present disclosure are not limited thereto. For example, the platooning controller 100 loaded into a following vehicle may collect information about platooning vehicles, may control to obtain views, and may perform avoid collision control.

The platooning controller 100 may include a communicator 110, a storage 120, and a processor 130.

The communicator 110 may be a hardware device implemented with various electronic circuits for transmitting and receiving a signal through wireless or wired connection. In some forms of the present disclosure, the communicator 110 may perform inter-vehicle communication through controller area network (CAN) communication, local interconnect network (LIN) communication, Ethernet communication, or the like.

The storage 120 may store a sensing result of the sensing device 200, sensing information received from platooning vehicles, or the result of determining whether a view is obstructed, obtained by the processor 130.

Furthermore, the storage 120 may store the sensing result of the sensing device 200, driving costs (e.g., a level of contribution, a level of emergency, fuel consumption, risk, and the like) obtained by the processor 130, information received from another vehicle (e.g., a leading vehicle) in a platooning line, or the like. The storage 120 may include at least one type of storage medium, such as a flash memory type memory, a hard disk type memory, micro type memory, a card type memory (e.g., a secure digital (SD) card or an extreme digital (XD) card), random access memory (RAM), a static RAM (SRAM), a read-only memory (ROM), a programmable ROM (PROM), an electrically erasable PROM (EPROM), a magnetic RAM (MRAM), a magnetic disk, and/or an optical disk.

The processor 130 may be electrically connected with the communicator 110, the storage 120, or the like and may electrically control the respective components. The processor 130 may be an electrical circuit which executes instructions of software and may perform a variety of data processing and calculation described below.

The processor 130 may identify information about outside vehicles around a platooning line based on sensing information of platooning vehicles, may determine whether views of the outside vehicles are obstructed by the platooning line based on the information about the outside vehicles, may control the platooning vehicles such that the views of the outside vehicles are obtained, and may control the platooning vehicles to avoid a collision prediction point where it is predicted that the outside vehicles will collide with each other to travel.

The processor 130 may determine whether views of outside vehicles are obstructed by platooning vehicles. When it is determined that the views of the outside vehicles are obstructed by the platooning vehicles, the processor 130 may determine whether there is a risk of collision between the outside vehicles, views of which are obstructed, based on collected information about the outside vehicles.

When there is the risk of collision between the outside vehicles, the processor 130 may calculate a collision prediction point and may control the warning device 500 to warn the platooning vehicles and the outside vehicles about the risk of collision.

When there is the risk of collision between the outside vehicles, the processor 130 may determine whether it is able to decelerate the platooning vehicles or change a lane of the platooning vehicles and may determine whether it is able to control to obtain views of the outside vehicles. In other words, when it is able to decelerate the platooning vehicles or change the lane of the platooning vehicles, the processor 130 may determine that it is able to control to obtain the views of the outside vehicles, and may decelerate the platooning vehicles or may change the lane of the platooning vehicles such that the views of the outside vehicles are obtained.

The processor 130 may control the platooning vehicles such that views of the outside vehicles are obtained, may determine whether it is able to decelerate the platooning vehicles or change a lane of the platooning vehicles and may determine that it is able for the platooning vehicles to avoid a collision prediction point of the outside vehicles to travel.

The processor 130 may control a speed of the platooning vehicles or may control a lane change of the platooning vehicles such that views of the outside vehicles are obtained, and may perform deceleration or lane change control such that the platooning vehicles avoid the collision prediction point of the outside vehicles to travel.

The sensing device 200 may include a plurality of sensors for sensing external objects, such as vehicles in front of and behind a host vehicle and outside vehicles which are not included in a platooning line, during platooning and may obtain information associated with a location of the external object, a speed of the external object, a movement direction of the external object, and/or a type (e.g., a vehicle, a pedestrian, a bicycle, a motorcycle, or the like) of the external object. To this end, the sensing device 200 may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like. Furthermore, the sensing device 200 may be mounted on the front, both sides, or the rear of the vehicle. Although not illustrated in FIG. 1, the vehicle system in some forms of the present disclosure may further include a global positioning system (GPS) receiver for receiving a GPS signal.

The communication device 300 may perform vehicle-to-everything (V2X) communication between vehicles during platooning and may share information for platooning and sensing information between platooning vehicles. In this case, the sensing information may include information detected by a sensing device loaded into each of the platooning vehicles.

The display 400 may display information received from vehicles which are during platooning, a driving situation and path of a host vehicle, or the like. When receiving a location change approval request from a leading vehicle, the display 400 may display the location change approval request. When a user touches the display 400, the processor 130 may approve the change. The display 400 may be implemented as a head-up display (HUD), a cluster, an audio video navigation (AVN), or the like. Furthermore, the display 400 may include at least one of a liquid crystal display (LCD), thin film transistor-LCD (TFT-LCD), a light emitting diode (LED) display, an organic LED (OLED) display, an active matrix OLED (ANGLED) display, a flexible display, a bended display, and/or a three-dimensional (3D) display. Some thereof may be implemented as transparent displays configured as a transparent type or a semi-transparent type to see the outside. Moreover, the display 400 may be implemented as a touchscreen including a touch panel to be used as an input device other than an output device.

The warning device 500 may be controlled by the platooning controller 100 to warn the outside vehicles and the platooning vehicles about a risk and may provide a visual or audible warning. To this end, the warning device 500 may include at least one or more of turn signals, emergency lights, a horn, an external light device, and/or a vehicle-to-vehicle (V2V) communication device.

In other words, the warning device 500 may turn on/off the turn signals several times, may turn on the emergency lights, may sound the horn, may transmit risk notification contents through V2V communication, or may turn on the external light device to provide a waning.

Figure 3:
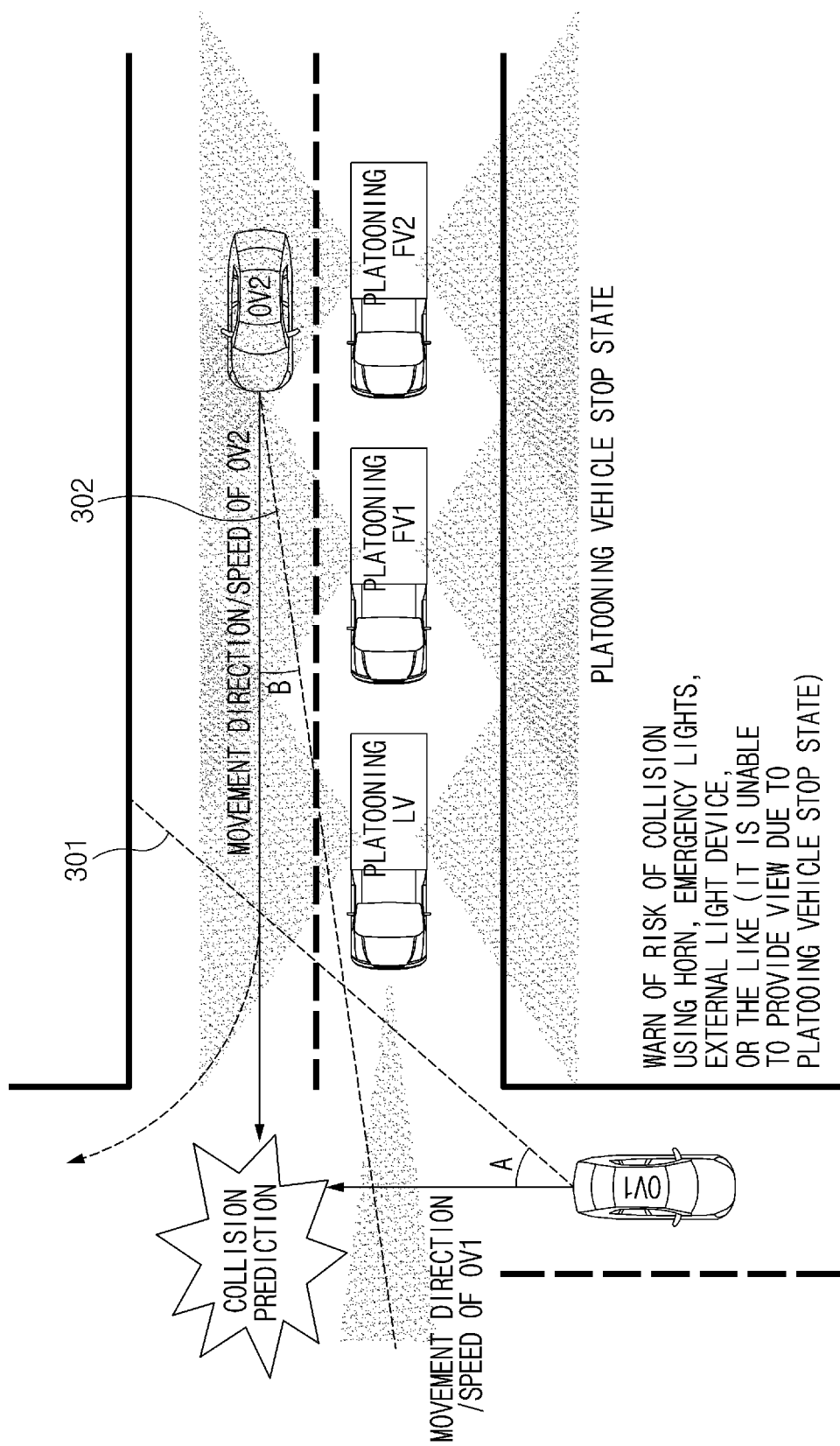
FIG. 3 is a drawing illustrating an exemplary operation of warning outside vehicles that views of the outside vehicles are limited, when the views of the outside vehicles are limited at an intersection by a platooning line in one form of the present disclosure.

FIG. 3 is a drawing illustrating an exemplary operation of warning outside vehicles that views of the outside vehicles are limited, when the views of the outside vehicles are limited at an intersection by a platooning line in some forms of the present disclosure.

Referring to FIG. 3, it may be seen that views 301 and 302 of outside vehicles OV1 and OV2 are hidden and obstructed by platooning vehicles LV, FV1, and FV2.

Thus, a platooning controller 100 of FIG. 2 may reduce a platooning speed of the platooning vehicles LV, FV1, and FV2 or may change a lane of the platooning vehicles LV, FV1, and FV2 to increase viewing angles A and B of the outside vehicles OV1 and OV2. The platooning controller 100 may calculate a collision prediction point between the outside vehicle OV1 and the outside vehicle OV2 with regard to locations, movement directions, or speeds of the outside vehicles OV1 and OV2.

Thus, the platooning controller 100 may warn the platooning vehicles LV, FV1, and FV2 and the outside vehicles OV1 and OV2 about a risk of collision. In this case, when warning of the risk of collision, the platooning controller 100 may provide information about vehicles, views of which are obstructed, information indicating whether the outside vehicles OV1 and OV2 collides with each other, information about a collision prediction point, or the like to the platooning vehicles LV, FV1, and FV2 and the outside vehicles OV1 and OV2.

Figure 4:
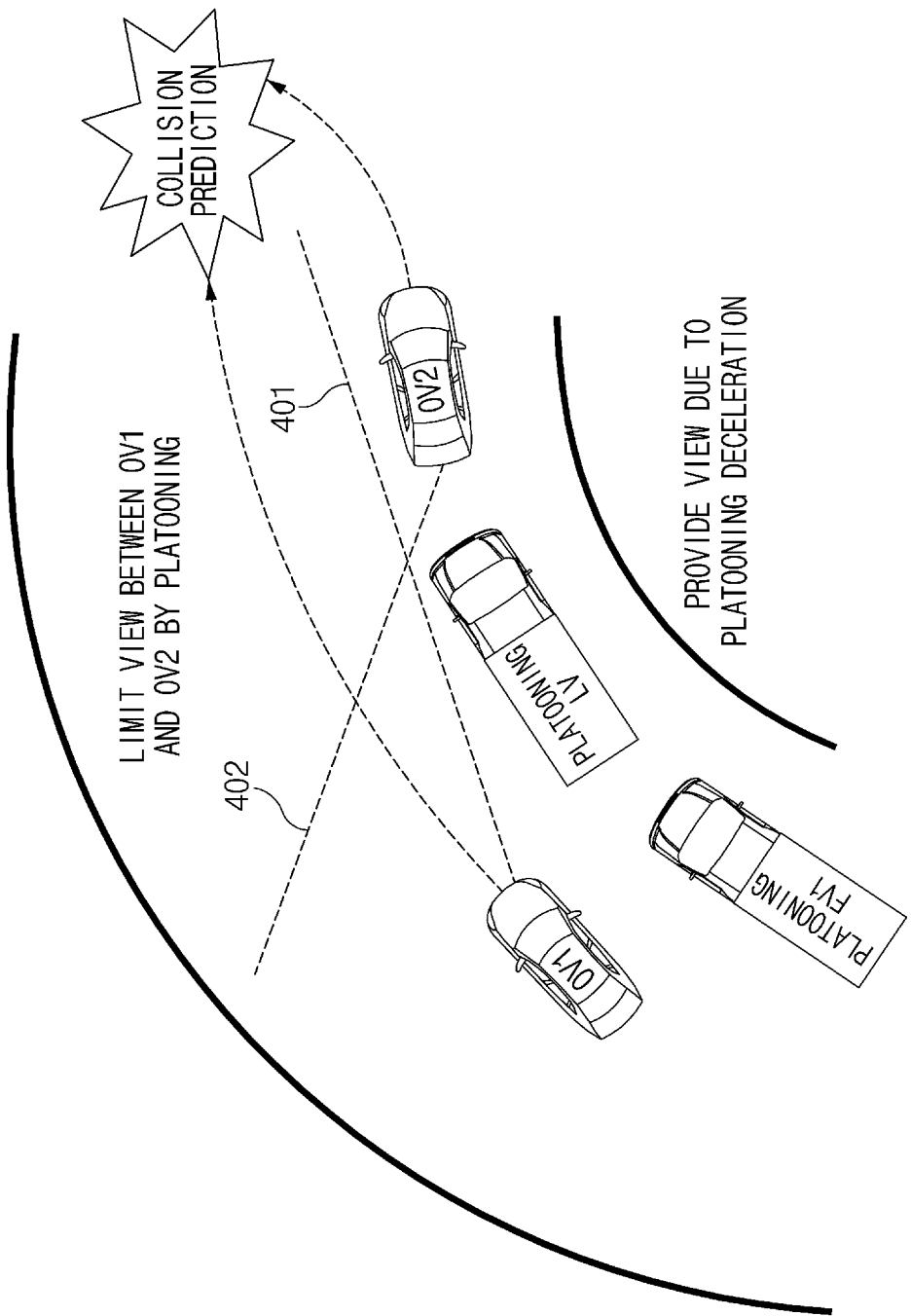
FIG. 4 is a drawing illustrating an exemplary operation of decelerating platooning vehicles when views of outside vehicles are limited on a curved section by a platooning line in one form of the present disclosure.

FIG. 4 is a drawing illustrating an exemplary operation of decelerating platooning vehicles when views of outside vehicles are limited on a curved section by a platooning line in some forms of the present disclosure.

Referring to FIG. 4, because views 401 and 402 of outside vehicles OV1 and OV2 are obstructed on a curved road section, the outside vehicles OV1 and OV2 may fail to recognize each other. Thus, a platooning controller 100 of FIG. 2 may decelerate platooning vehicles LV and FV1 such that a view between the outside vehicles OV1 and OV2 may be obtained.

Figure 5:
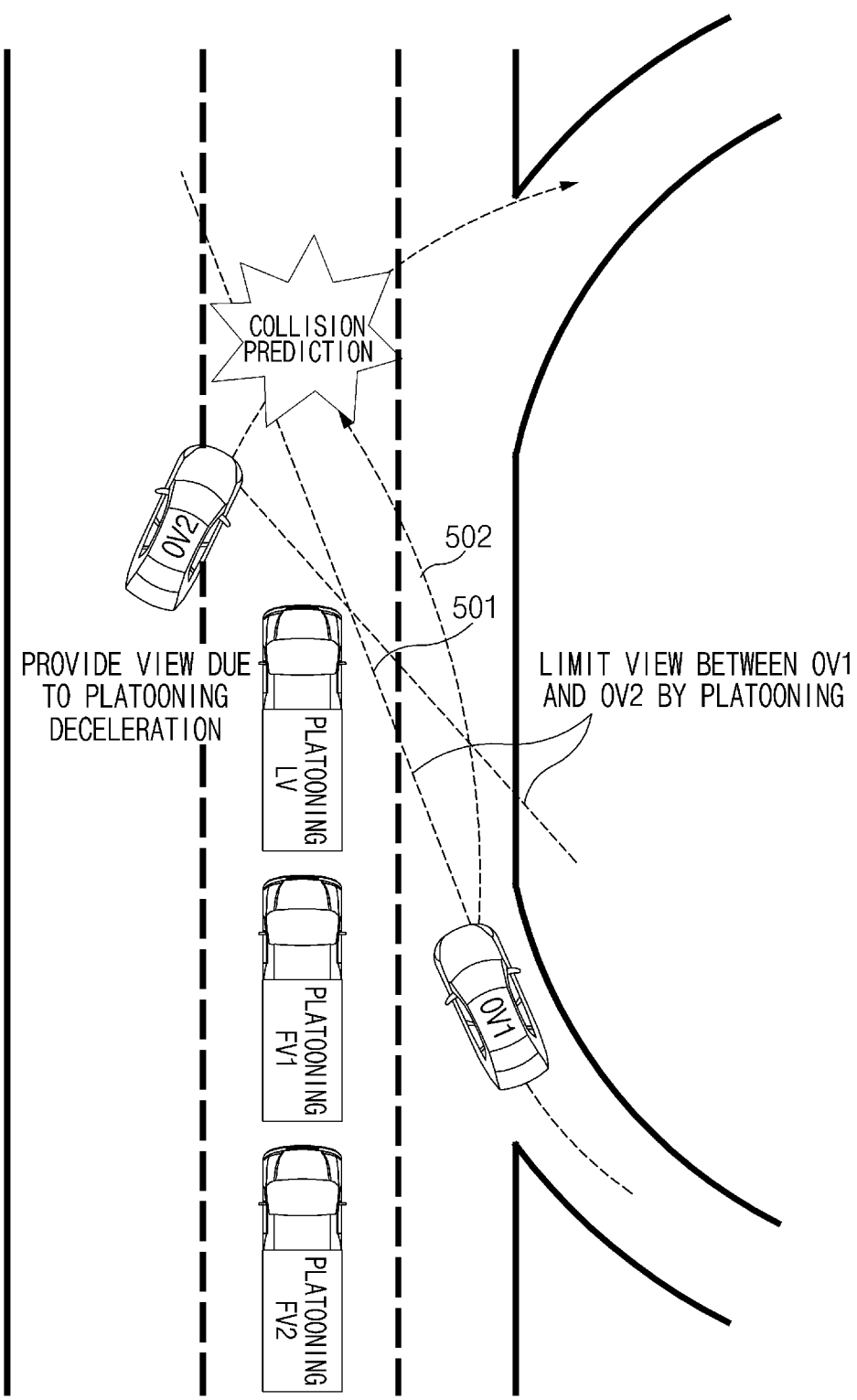
FIG. 5 is a drawing illustrating an exemplary operation of decelerating platooning vehicles when views of outside vehicles are limited on exit and entrance ramps by a platooning line in one form of the present disclosure.

FIG. 5 is a drawing illustrating an exemplary operation of decelerating platooning vehicles when views of outside vehicles are limited on exit and entrance ramps by a platooning line in some forms of the present disclosure.

Referring to FIG. 5, views of outside vehicles OV1 and OV2 may be limited on exit and entrance ramps by platooning vehicles LV, FV1, and FV2. The outside vehicle OV1 which enters from an entrance ramp at the right of a platooning line and the outside vehicle OV2 which is traveling on the left of the platooning line and attempts to change its lane to a lane of the platooning line may fail to recognize each other. Thus, a platooning controller 100 of FIG. 2 may decelerate the platooning vehicles LV, FV1, and FV2 such that a view between the outside vehicles OV1 and OV2 may be obtained.

Figure 6:
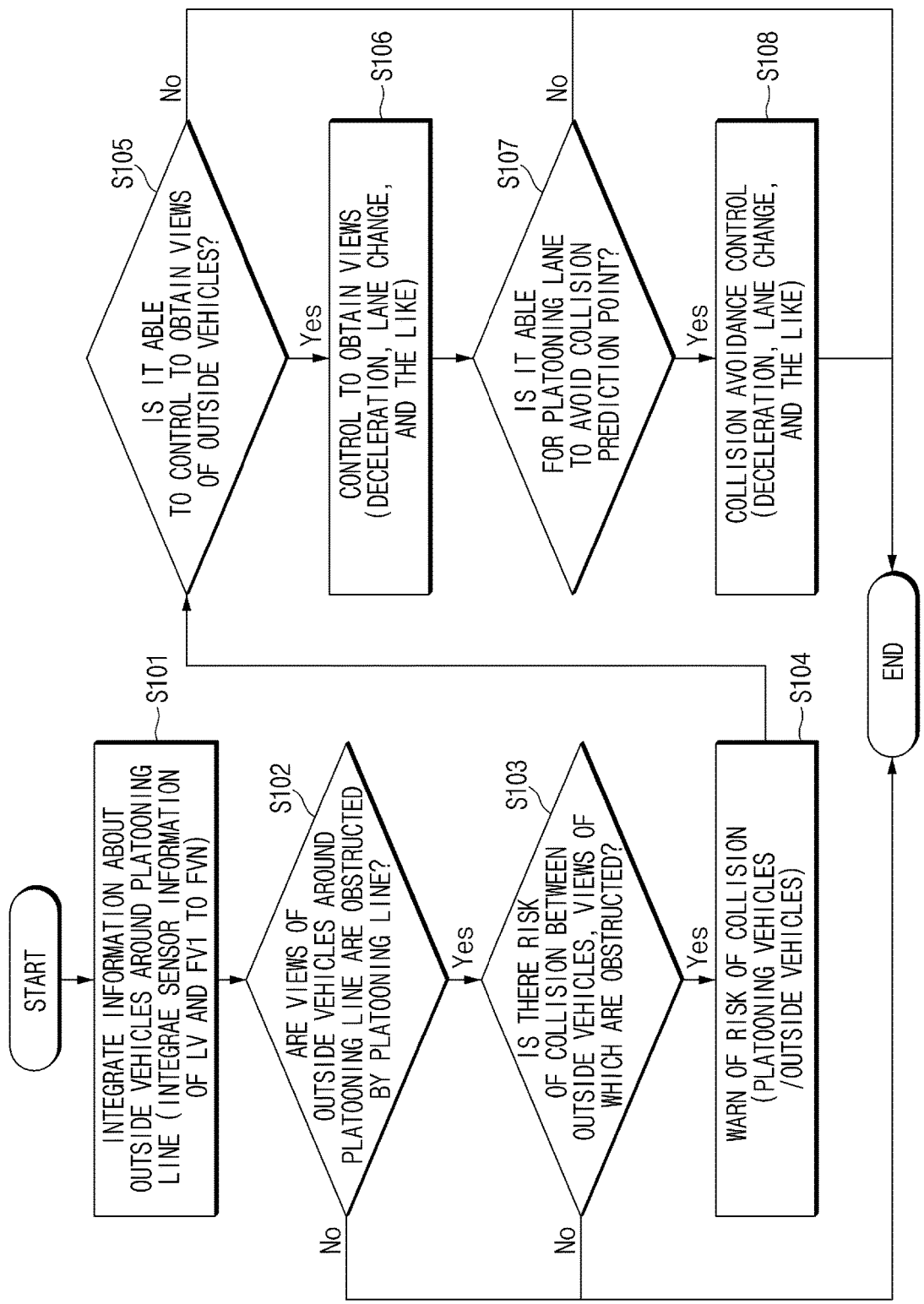
FIG. 6 is a flowchart illustrating a platooning control method in one form of the present disclosure.

Hereinafter, a description will be given in detail of a platooning control method in some forms of the present disclosure. FIG. 6 is a flowchart illustrating a platooning control method in some forms of the present disclosure.

Hereinafter, it is assumed that a platooning controller 100 of FIG. 2 performs a process of FIG. 6. Furthermore, in a description of FIG. 6, an operation described as being performed by an apparatus may be understood as being controlled by a processor 130 of the platooning controller 100 loaded into a leading vehicle LV among platooning vehicles.

In S101, the apparatus may collect and integrate information about outside vehicles around a platooning line from vehicles in the platooning line. For example, a sensing device of the leading vehicle LV may sense outside vehicle information such as a location, a speed, or a progress direction of a vehicle around the leading vehicle LV, and each of following vehicles FV1, FV2, and the like may sense a location, a speed, a progress direction, or the like of a vehicle around it using its sensing device. Thus, the apparatus of the leading vehicle LV may receive outside vehicle information from the following vehicles FV1 and FV2 through V2X communication, may integrate outside vehicle information collected through its sensing device, may specify outside vehicles, and may determine locations and speeds of the specified outside vehicles.

For example, referring to FIG. 3, the leading vehicle LV may detect a location, a movement direction, or a speed of the outside vehicle OV1, and each of the following vehicles FV1 and FV2 may detect a location, a movement direction, or a speed of the outside vehicle OV2. The leading vehicle LV may calculate an average value of the information of the outside vehicle OV2, received from the following vehicles FV1 and FV2, and may calculate a location, a movement direction, a speed, or the like of the outside vehicle OV2 using the average value.

In S102, the apparatus may determine whether views 301 and 302 of at least one or more outside vehicles around the platooning line are obstructed by the platooning line based on the integrated outside vehicle information. In S103, the apparatus may determine whether there is a risk of collision between the outside vehicles, views of which are obstructed. In other words, the leading vehicle LV may calculate viewing angles A and B of users of the outside vehicles OV1 and OV2 based on movement directions and locations of the outside vehicles OV1 and OV2 and may determine whether the users do not see another vehicle because a range of the viewing angles of the users becomes narrow due to the platooning line. In this case, the viewing angle may include a range which is not blocked by platooning vehicles in a left and right direction from a reference line generated by drawing an extension line in a movement direction from a current location of each of outside vehicles.

As such, it is determined that, because the viewing angle becomes narrow, outside vehicles do not recognize each other, the leading vehicle LV may determine a collision prediction point with regard to locations, movement directions, speeds, or the like of the outside vehicles OV1 and OV2. In this case, various general technologies are applicable to a technology of determining the collision prediction point.

As a result of the determination in S103, when there is the risk of collision between the outside vehicles, views of which are obstructed, in S104, the apparatus may warn the platooning vehicles and the outside vehicles about the risk of collision.

In other words, when it is determined that there is the risk of collision between the outside vehicles, the apparatus may interwork with a warning device 500 of FIG. 2 and may warn a user of platooning vehicles and a user of a target vehicle about the risk of collision using available means such as turn signals, emergency lights, a horn, a V2V communication device, and an external light device. In other words, the warning device 500 may turn on/off the turn signals several times, may turn on the emergency lights, may sound the horn, may transmit risk notification contents through V2V communication, or may turn on the external light device to provide a warning.

In S105, the apparatus may determine whether it is able to control to obtain a view of the outside vehicle by the platooning vehicles. In other words, the apparatus may determine whether it is able to reduce a platooning speed or change a lane to increase the viewing angles A and B of the outside vehicles OV1 and OV2 and may determine whether it is able to control to obtain a view.

When it is able to reduce the platooning speed or change the lane, in S106, the apparatus may determine that it is able to control to obtain a view of an outside vehicle and may perform platooning control to obtain the view of the outside vehicle. In other words, the apparatus may perform control, for example, may reduce the entire speed of the platooning vehicles or may change a lane of the platooning vehicles to obtain a view of the outside vehicle. When there is a risk of collision due to view obstruction by the platooning vehicles, the apparatus may reduce a platooning speed to obtain views of outside vehicles having the risk of collision. When it is predicted to collide between outside vehicles in front, the apparatus may reduce a platooning speed and may change a lane to avoid the collision. FIG. 3 illustrates that, because it is unable to change a lane on a two-lane road or because there is no another vehicle which is traveling behind a platooning line, it is able to reduce a platooning speed and perform platooning control for obtaining a view. As such, when the platooning speed is reduced, a viewing angle of an outside vehicle may be increased.

As such, the apparatus may reduce the platooning speed. As the viewing angles of the outside vehicles are increased, when views of users of the outside vehicles are obtained, the users of the outside vehicles may determine whether there is collision through their views and may control their driving. However, although the view is obtained, in consideration of when the user does not recognize another outside vehicle, there is a need to avoid a collision prediction point between the outside vehicles OV1 and OV2, calculated in S103 for safer driving.

In S107, the apparatus may determine whether it is able for a platooning line to avoid a collision prediction point. In S108, the apparatus may perform collision avoidance control by performing deceleration, a lane change, and the like. In other words, after a view of the outside vehicle is obtained, the apparatus may determine whether it is able to more reduce a current platooning speed or when it is able to perform a lane change. Because there is no outside vehicle which is traveling behind a platooning line or because an inter-vehicle distance from the outside vehicle which is traveling behind the platooning line is long, when a risk of collision is low or when it is able to change a lane of platooning vehicles, the apparatus may determine that it is able to perform collision avoidance control.

As such, the apparatus may control platooning vehicles to reduce a risk of secondary collision between the platooning line and the outside vehicle, thus maximally preventing a collision accident.

As such, some forms of the present disclosure may integrate outside vehicle information detected by platooning vehicles, may calculate a risk of collision between outside vehicles, capable of being generated due to a limit on a user view area and a sensor sensing area by a platooning line, may warn a user of platooning vehicles a user of an outside vehicle about a corresponding situation when detecting the risk of collision, and may control the platooning vehicles with regard to obtaining a view of the user of the outside vehicle if necessary. Thus, some forms of the present disclosure may inhibit an accident between outside vehicles from being caused by the platooning line and may protect platooning vehicles from secondary damage by the accident between the outside vehicles.

Figure 7:
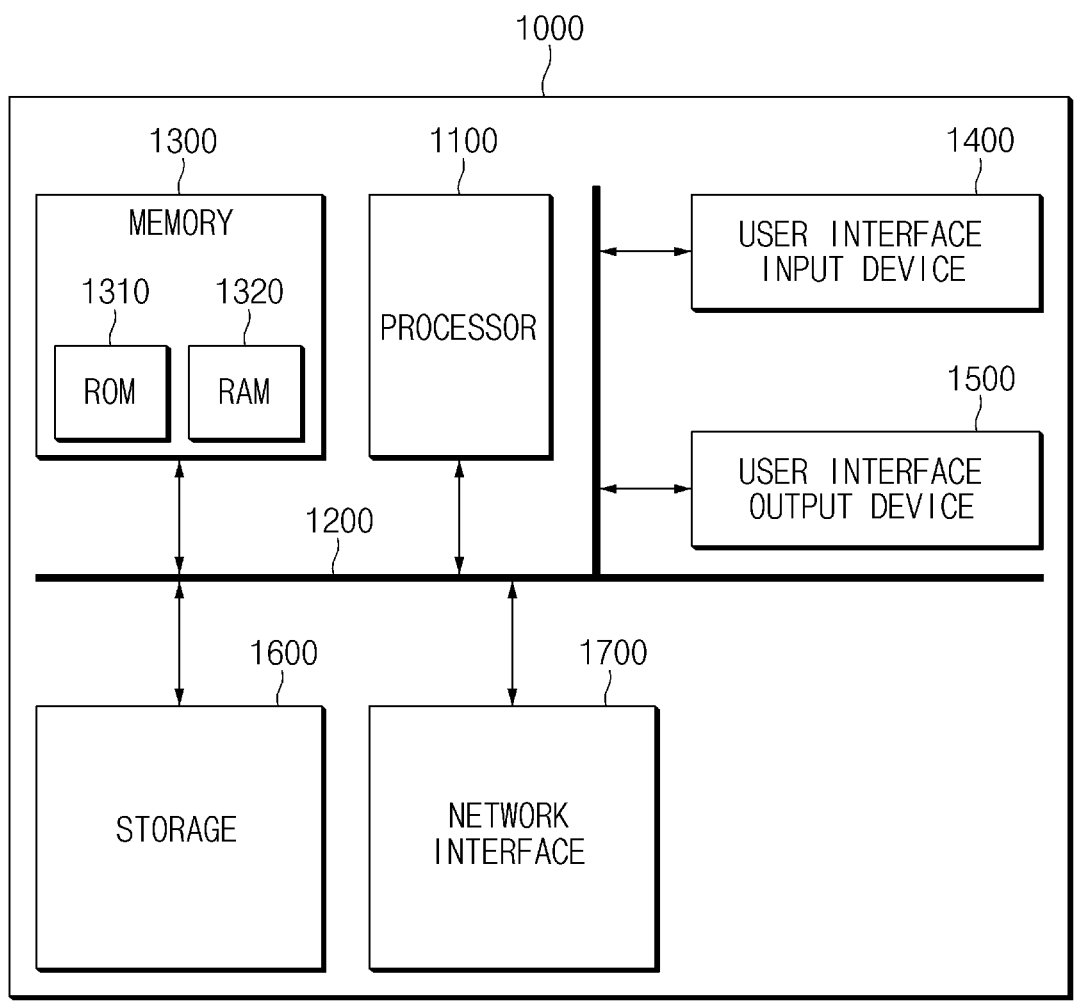
FIG. 7 is a block diagram illustrating a computing system in one form of the present disclosure.

FIG. 7 is a block diagram illustrating a computing system in some forms of the present disclosure.

Referring to FIG. 7, a computing system 1000 may include at least one processor 1100, a memory 1300, a user interface input device 1400, a user interface output device 1500, storage 1600, and/or a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may prevent an accident between outside vehicles from being caused by a platooning line during platooning and may prevent secondary damage of platooning vehicles by the accident between the outside vehicles.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A platooning controller, comprising:
a processor configured to:
identify information about outside vehicles around a platooning line based on sensing information of platooning vehicles;
determine whether views of the outside vehicles are obstructed by the platooning line based on the information about the outside vehicles;
control the platooning vehicles such that the views of the outside vehicles are obtained; and
perform controlling a platooning vehicle to avoid a collision among two or more outside vehicles by determining a collision prediction point of the collision among the two or more outside vehicles caused by a view obstruction; and
a storage configured to store the sensing information or a result of determination of whether the views are obstructed,
wherein the platooning controller is mounted on the platooning vehicle, and the outside vehicles are not in the platooning line and are not controlled by the platooning controller.

2. The platooning controller of claim 1, wherein the information about the outside vehicles includes at least one of locations of the outside vehicles, movement directions of the outside vehicles, or speeds of the outside vehicles.

3. The platooning controller of claim 1, wherein the processor is further configured to:
determine whether a risk of the collision among the two or more outside vehicles is present when it is determined that the views of the outside vehicles are obstructed.

4. The platooning controller of claim 3, wherein the processor is further configured to:
warn the platooning vehicles and the outside vehicles about the risk of the collision when the risk of the collision is determined to be present.

5. The platooning controller of claim 3, wherein the processor is further configured to:
determine whether it is possible to obtain the views of the outside vehicles when the risk of the collision is determined to be present.

6. The platooning controller of claim 5, wherein the processor is further configured to:
determine whether to decelerate the platooning vehicles or change a lane of the platooning vehicles; and
determine whether it is possible to obtain the views of the outside vehicles.

7. The platooning controller of claim 6, wherein the processor is further configured to:
control the platooning vehicles to obtain the views of the outside vehicles; and
determine whether the platooning vehicles are capable of avoiding the collision prediction point.

8. The platooning controller of claim 7, wherein the processor is further configured to:
determine whether to decelerate the platooning vehicles or change the lane of the platooning vehicles.

9. The platooning controller of claim 7, wherein the processor is further configured to:
obtain the views of the outside vehicles; and
decelerate the platooning vehicles or change the lane of the platooning vehicles such that the platooning vehicles are capable of avoiding the collision prediction point.

10. A vehicle system, comprising:
a communicator configured to communicate between platooning vehicles; and
a platooning controller configured to:
identify information about outside vehicles around a platooning line based on sensing information of the platooning vehicles;
determine whether views of the outside vehicles are obstructed by the platooning line based on the sensing information about the outside vehicles;
control the platooning vehicles such that the views of the outside vehicles are obtained; and
perform controlling a platooning vehicle to avoid a collision among two or more outside vehicles by determining a collision prediction point of the collision among the two or more outside vehicles caused by a view obstruction,
wherein the platooning controller is mounted on the platooning vehicle, and the outside vehicles are not in the platooning line and are not controlled by the platooning controller.

11. The vehicle system of claim 10, wherein the system further comprises:
a warning device configured to warn the outside vehicles about a risk when the risk of the collision among the two or more outside vehicles is present.

12. The vehicle system of claim 11, wherein the warning device includes at least one of turn signals, emergency lights, a horn, an external light device, or a vehicle-to-vehicle (V2V) communication device.

13. The vehicle system of claim 12, wherein the platooning controller is further configured to:
determine whether the risk of the collision among the two or more outside vehicles is present when it is determined that the views of the outside vehicles are obstructed;
warn the platooning vehicles and the outside vehicles about the risk of collision using the warning device when the risk of collision is present; and
obtain the views of the outside vehicles.

14. The vehicle system of claim 13, wherein the platooning controller is further configured to:
determine whether to decelerate the platooning vehicles or change a lane of the platooning vehicles; and
determine whether the platooning vehicles avoid the collision prediction point of the outside vehicles.

15. The vehicle system of claim 10, wherein the system further comprises:
a display configured to display at least one of information for platooning, information about the outside vehicles, or a screen configured to warn a risk of the collision.

16. A platooning control method, comprising:
identifying, by a processor, information about outside vehicles around a platooning line based on sensing information of platooning vehicles;
determining, by the processor, whether views of the outside vehicles are obstructed by the platooning line based on the sensing information about the outside vehicles;
when the views are determined to be obstructed, controlling, by the processor, the platooning vehicles such that the views of the outside vehicles are obtained; and
controlling, by the processor, the platooning vehicles to avoid a collision among two or more outside vehicles by determining a collision prediction point of the collision among the two or more outside vehicles caused by a view obstruction, wherein the processor is mounted on the platooning vehicle, and the outside vehicles are not in the platooning line and are not controlled by the platooning controller.

17. The platooning control method of claim 16, wherein determining whether the views of the outside vehicles are obstructed comprises:
   calculating, by the processor, viewing angles of users of the outside vehicles based on locations of the outside vehicles, movement directions of the outside vehicles, and speeds of the outside vehicles; and
   when any of the outside vehicles is not seen within the viewing angles of the users of the outside vehicles, determining, by the processor, that the views are obstructed.

18. The platooning control method of claim 16, wherein controlling the platooning vehicles comprises:
   decelerating, by the processor, the platooning vehicles or changing a lane of the platooning vehicles.

* * * * *